(12) United States Patent
Godefroy et al.

(10) Patent No.: US 9,515,752 B2
(45) Date of Patent: Dec. 6, 2016

(54) METHOD FOR MAPPING WI-FI FINGERPRINTS BY MEANS OF BLIND COLLECTION OF RSS MEASUREMENTS

(71) Applicant: POLE STAR, Toulouse (FR)

(72) Inventors: Baptiste Godefroy, Saint Sulpice sur Leze (FR); Nicolas Etienne, Toulouse (FR); Jean-Baptiste Prost, Toulouse (FR); Cyril Laderriere, Toulouse (FR)

(73) Assignee: Pole Star, Toulouse (FR)

( * ) Notice: Subject to any disclaimer, the term of this patent is extended or adjusted under 35 U.S.C. 154(b) by 141 days.

(21) Appl. No.: 14/377,835

(22) PCT Filed: Feb. 18, 2013

(86) PCT No.: PCT/EP2013/053157
§ 371 (c)(1),
(2) Date: Aug. 8, 2014

(87) PCT Pub. No.: WO2013/121036
PCT Pub. Date: Aug. 22, 2013

(65) Prior Publication Data
US 2016/0112150 A1    Apr. 21, 2016

(30) Foreign Application Priority Data
Feb. 17, 2012    (FR) ...................... 12 51492

(51) Int. Cl.
| | |
|---|---|
| *H04B 17/318* | (2015.01) |
| *H04W 64/00* | (2009.01) |
| *G01S 5/02* | (2010.01) |
| *H04L 12/26* | (2006.01) |
| *H04W 84/12* | (2009.01) |

(52) U.S. Cl.
CPC .......... *H04B 17/318* (2015.01); *G01S 5/0252* (2013.01); *H04L 43/045* (2013.01); *H04W 64/00* (2013.01); *H04W 84/12* (2013.01)

(58) Field of Classification Search
CPC .. H04B 17/318; H04B 43/045; H04B 64/00; H04B 84/12
See application file for complete search history.

(56) References Cited

U.S. PATENT DOCUMENTS

| | | | |
|---|---|---|---|
| 2008/0181503 A1* | 7/2008 | Schclar | G06K 9/342 382/181 |
| 2012/0165012 A1* | 6/2012 | Fischer | G01S 5/0242 455/435.1 |

OTHER PUBLICATIONS

Ferris, B. et al., "Wi-Fi SLAM using gaussian process latent variable models", Proc. of the International Joint Conf. on Artificial Intelligence (IJCAI), 2007, pp. 2480-2485.
(Continued)

*Primary Examiner* — Mohammad Anwar
(74) *Attorney, Agent, or Firm* — Nixon Peabody LLP; Khaled Shami

(57) ABSTRACT

This invention relates to a method for mapping Wi-Fi fingerprints in a given geographical area. A user, provided with a receiver, sequentially collects Wi-Fi signal strength measurements by moving along the path thereof, with each measurement being constituted by a vector of RSS levels received from the various Wi-Fi access points. A graph that is representative of the path is determined from the sequence of measurements. Thanks to a geometric model of the area, a topographical characterization of the path is carried out on the basis of the previously obtained graph. The positions of the various measurements of the sequence are provided by the topographical characterization and stored with said measurements in a database.

18 Claims, 6 Drawing Sheets

(56) References Cited

OTHER PUBLICATIONS

Ellis, C. et al., "A comparison of MDS-MAP and non-linear regression", Proc. of 2010 International Conference on Indoor Positioning and Indoor Navigation (IPIN), Sep. 15-17, 2010, (Zurich), 6 pages.

Schaeffer, S.E., "Graph clustering", Computer Science Review I, 2007, pp. 27-64.

Zaslavskiy M. et al., "A path following algorithm for the graph matching problem", IEEE Transactions on Pattern Analysis and Machine Intelligence, vol. 31, No. 12, Dec. 2009, pp. 2227-2242.

Jahyoung Koo et al., "Autonomous Construction of a WiFi Access Point Map Using Multidimensional Scaling" In: "Field Programmable Logic and Application", Springer Berlin Heidelberg, Berlin, vol. 6696, Jan. 1, 2011, pp. 115-132.

Yi Shang et al., "Localization from mere connectivity", Proceedings of the 4th ACM International Symposium on Mobile Ad Hoc Networking & Computing, Mobihoc '03, New York, NY, Jan. 1, 2003, pp. 201-212.

International Search Report in PCT/EP2013/053157, European Patent Office, Rijswijk, NL, mailed May 17, 2013.

* cited by examiner

METHOD FOR MAPPING WI-FI FINGERPRINTS BY MEANS OF BLIND COLLECTION OF RSS MEASUREMENTS

CROSS-REFERENCE TO RELATED PATENT APPLICATION

The present application is a National Stage Application of International Application No. PCT/EP2013/053157 entitled "METHOD FOR MAPPING WI-FI SIGNATURES BY MEANS OF BLIND COLLECTION OF RSS MEASUREMENT" filed Feb. 18, 2013, which claims priority to French Patent Application Number 12 51492 filed Feb. 17, 2012, the contents of which are incorporated herein by reference in their entirety.

TECHNICAL FIELD

This invention relates to the field of positioning, in particular inside buildings (indoor positioning), by means of Wi-Fi fingerprints. It relates more particularly to a method for mapping such fingerprints thanks to a blind collection of RSS (Received Signal Strength) measurements.

PRIOR ART

The method of positioning by means of Wi-Fi fingerprints has been the subject of much research in the last few years. It is indeed particularly promising for the positioning in an environment wherein the GPS signals are hardly available, or even not available, such as the areas located inside buildings (indoor environment).

The principle of such a method of positioning is based on the hypothesis that each point of the area considered can be unequivocally characterised by the strength levels (RSS) of the Wi-Fi signals emitted by the access points (APs) in this area. The vector constituted by the Wi-Fi signal strength levels received at a point is still referred to as Wi-Fi fingerprint for this point.

A receiver (terminal, smartphone) can then obtain the position thereof by carrying out a measurement of the levels of the strength of the Wi-Fi signals present. This measurement is compared with the Wi-Fi fingerprints stored in a database representing the RSS mapping of the area considered and the position of the receiver is given by that of the point having the Wi-Fi fingerprint which is closest to the measurement, in terms of a certain metrics.

The aforementioned method of positioning however has the disadvantage of requiring the constitution beforehand of a database containing the RSS mapping of the area considered. The constitution of the database generally requires carrying out a campaign of measurements by systematically passing through the area and by noting the RSS levels with the coordinates of each point of measurement.

This constraint makes the implementation of such a method of positioning by RSS fingerprint complex and expensive.

A method of positioning has recently been proposed, called WiFi-SLAM (Simultaneous Localization And Mapping), which makes it possible to avoid having to constitute a database beforehand. A description of this can be found in the article of B. Ferris et al. entitled "Wi-Fi SLAM using gaussian process latent variable models" published in Proc. of the International Joint Conf. on Artificial Intelligence, 2007, pages 2480-2485. However, this method is based on restrictive hypotheses on a probabilistic model (GP-LVM) between the RSS levels and the positions of measurement which are not often carried out in practice. Furthermore, it does make it possible to obtain a precise positioning in a complex environment.

A first purpose of this invention is to propose a method for mapping RSS measurements, without taking the coordinates of the points of measurement (blind collection of RSS measurements), which is well-suited to a collaborative approach and which can be used in an environment whatsoever. A second purpose of this invention is to allow for a positioning which does not require a prior measurement campaign.

DISCLOSURE OF THE INVENTION

This invention is defined as a method for mapping Wi-Fi fingerprints in a predetermined geographical area, comprising:
  a step of collecting Wi-Fi signal strength measurements, with each measurement being represented by a vector constituted by the respective strength levels of the signals emitted by a plurality of Wi-Fi access points, with the collecting of said measurements being carried out sequentially along at least one path of a user within said geographical area, in order to provide at least one sequence of measurements;
  a step of determining a graph that is representative of the path, each measurement of said sequence corresponding to a node or to a single point of an edge of this graph;
  a step of topographical characterisation of said path using at least said graph that is representative of the path and a geometric model of the geographical area, with the topographical characterisation associating to each measurement a point of the geometric model;
  a step of storing the sequence of measurements in a database, with each measurement stored in relation with the point of the geometric model that was associated to it in the preceding step.

The step of determining the graph that is representative of the path advantageously comprises the calculation of a matrix of distances constituted by distances between the measurements of said sequence, taken two by two, with the measurements of said sequence being sorted according to a predetermined chronological order.

The step of determining the graph that is representative of the path typically comprises the following steps:
  constructing of a first graph, referred to as neighbourhood graph, of which each node corresponds to a measurement of said sequence of measurements, with two nodes of the first graph being connected by an edge if the measurements corresponding to these nodes satisfy a neighbourhood criterion, with said edge then being assigned a weight equal to the distance between these measurements;
  constructing of a second graph, of which the nodes are identical to the nodes of the first graph, referred to as a geodesic graph, with two nodes of the geodesic graph being connected by an edge of which the weight is equal to the length of the shortest path between these nodes in the neighbourhood graph.

According to an alternative, the geodesic graph is subjected to a reduction in dimension using a MDS-MAP algorithm.

The graph that is representative of the path is then obtained by simplification of the geodesic graph.

The simplification of the geodesic graph can be carried out in particular by means of a clustering of this graph, after a reduction in dimension or not, with the nodes of the graph that is representative of the path being respective representatives of the clusters obtained as such.

In this case, the clustering of the geodesic graph can be carried out by:
- carrying out an analysis by main components of the measurements corresponding to the nodes of the geodesic graph located in a neighbourhood of this node;
- classifying in descending order the own values obtained by said analysis;
- comparing the ratio of the first to the second own value in relation to a predetermined threshold, with the node being classified as being of the first type, if the ratio is greater than this threshold, and as being of the second type, in the opposite case;
- grouping together into the same cluster the nodes of the second type that satisfy a predetermined criterion of connectivity.

The criterion of connectivity of a node of the geodesic graph can be the number of edges connected to this node in the neighbourhood graph.

To each measurement is associated a point of the graph that is representative of the path, said point being defined either as a node or as a point of an edge of this graph.

If the node of the geodesic graph representing said measurement is also part of the graph that is representative of the path, the measurement is associated with this node, and, otherwise, the node of the geodesic graph, representing said measurement, is projected on an edge connecting first and second nodes, the measurement then being associated with the point obtained by projection, defined by the pair of said first and second nodes and by a interpolation coefficient between these nodes.

The step of topographical characterisation of the path can comprise a matching of the nodes of the graph that is representative of the path with the nodes of a graph extracted from the geometric model, referred to as geometric graph, and a search for edges that are common to the graph that is representative of the path and to the geometric graph.

Each measurement associated with a node of the graph that is representative of the path is then attributed the position of the node of the geometric graph that is matched to it, and each measurement associated to a point of an edge of the graph that is representative of the path is attributed a position obtained by interpolation between the positions of the nodes of the geometric graph respectively matched to the nodes connected by this edge in said representative graph.

For a given measurement, the interpolation between the positions of the nodes of the geometric graph more preferably use the same interpolation coefficient as that between nodes of the graph that is representative of the path.

A measurement at least of the sequence can be labelled by a label giving position information.

If the labelled measurement is associated with a node of the graph that is representative of the path, this node is matched to the node of the geometric graph that has the position that is closest to that given by the label of the measurement.

DETAILED DISCLOSURE OF PARTICULAR EMBODIMENTS

Figure 1:
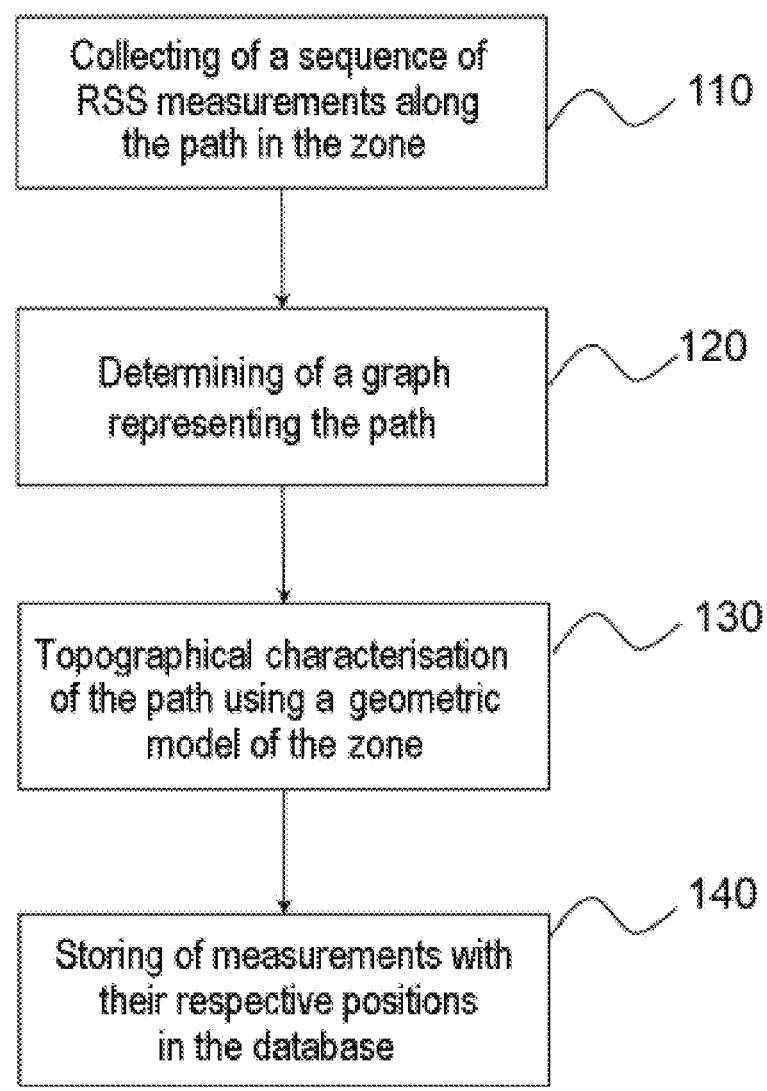
FIG. 1 diagrammatically shows a flowchart of the method for mapping Wi-Fi fingerprints according to an embodiment of this invention.

The basic principle of the invention is to use the sequence of measurements of a user passing through the area in order to determine a graph that is representative of the path thereof, and carry out a topographical characterisation of this path using a geometric model of the area in question.

More precisely, we shall consider in what follows a user provided with a receiver and passing through the area according to any path whatsoever, not known a priori. The user is provided with a receiver of Wi-Fi signals for example a terminal Wi-Fi or a smartphone capable of measuring, and either of recording locally or of transmitting to a remote server the RSS levels of the various access points.

We shall designate in what follows by RSS measurement vector, or more simply by RSS measurement or measurement, a vector of which the elements are the Wi-Fi signal strength levels received from the various access points (AP) of the geographical area considered. It is supposed that the various access points are indexed by their respective network identifiers (BSSID) and that the elements of the RSS measurement vector are unequivocally classified using their identifiers.

The receiver sequentially carries out RSS measurements along the path of the user in said geographical area. These measurements can be taken at regular intervals or not. If they are not taken at regular intervals, they are advantageously, but not necessarily, time stamped. The chronological sequence of the RSS measurements along the path of the user can be represented by a matrix:

$$M = \begin{pmatrix} \mu_1^1 & \mu_1^2 & \cdots & \mu_1^n & \cdots & \mu_1^{N-1} & \mu_1^N \\ \mu_2^1 & \mu_2^2 & \cdots & \mu_2^n & \cdots & \mu_2^{N-1} & \mu_2^N \\ \vdots & \vdots & \cdots & \cdots & \cdots & \vdots & \vdots \\ \mu_P^1 & \mu_P^2 & \cdots & \mu_P^n & \cdots & \mu_P^{N-1} & \mu_P^N \end{pmatrix} \quad (1)$$

where the element $\mu_p^n$ designates the nth measurement of the signal strength received from the pth access point. In what follows, the matrix M will also be referred to as sequence of RSS measurements or more simply sequence of measurements. The nth measurement of the user along the path thereof shall be noted as $\mu^n = (\mu_1^n, \ldots, \mu_p^n)^T$.

As a general rule, the RSS measurements obtained by the receiver are not labelled. Labelled measurement means measurement to which is associated position information.

This position information makes it possible to locate the location of the measurement with a more or less high degree of precision.

Certain RSS measurements of a sequence can however be labelled. This will in particular be the case, if GPS signals are available in certain points of measurement (in particular at the periphery of the indoor area) or if the receiver is provided with one or several sensor(s) that make it possible to carry out a logging in certain locations of the area considered.

Furthermore, the RSS measurements can be supplemented, where applicable, by physical measurements of additional sensors (for example provided on the smartphone of the user), such as magnetometer, accelerometer, barometer etc., carried out more preferably with MEMS technology. The measurements of the additional sensors can make it possible to calculate a relative path of the receiver according to a method of dead reckoning known per se. For example, if the receiver is provided with an accelerometer (or a speed sensor or even a pedometer), and a magnetometer, it can estimate via integration a distance travelled according to the direction indicated by a magnetometer. Where applicable, a change in reference frame between a reference frame tied to the receiver and the local territorial reference frame will be carried out in order to obtain this information.

In practice, the path obtained by dead reckoning (also referred to in what follows as dead reckoning path) exhibits a time drift due to the integration of the speed signal or of the double integration of the acceleration signal. Furthermore, the magnetometric measurements (direction of the magnetic field) can be affected by errors due to the local disturbances of the field.

The path obtained by dead reckoning can be advantageously used in certain embodiments of the invention as described in detail hereinbelow.

The invention applies advantageously to a collaborative context, i.e. in the case where several users carry out measurement sequences. It shall also be understood that the same user can carry out separate sequences by successively passing through different paths. The preceding situations are able to fall under the same formalism when a composite path constituted of K paths of one or several user(s) is considered. The sequence of measurements to be considered is none other than the concatenation of the matrices $M^{(1)}, \ldots, M^{(K)}$, relative to the various paths considered. This can therefore be brought back without loss of generality to the path of a user, with the latter able to not be connected (in the topological meaning).

FIG. 1 diagrammatically shows a flowchart of the RSS mapping method according to an embodiment of the invention.

In a first step, 110, at least one sequence of RSS measurements of a user is collected. The RSS measurements can be collected locally on the receiver before being transmitted by block to a remote server. Alternatively, the measurements can be transmitted one by one to the server. As has been indicated hereinabove, the step of collecting can relate to several users and therefore several paths, $k=1, \ldots, K$, with each path of a user giving rise to an elementary sequence of RSS measurements represented by a matrix $M^{(k)}$, with the sequence of measurements then being represented by the concatenation of these matrices.

In a second step, 120, from the sequence of measurements collected, a graph that is representative of the path considered is determined, with each measurement of said sequence corresponding to a point (node or point of an edge) of this graph.

The step 130, referred to as step of topographical characterisation, uses the representative graph obtained in the preceding step and a geometric model of the area considered in order to associate to each RSS measurement a corresponding point of the geometric model. Geometric model means a simplified representation of the area considered, for example a wired representation of this area. The geometric model can be a conventional navigation graph allowing for the calculation of itineraries between different points of interest of this area. The geometric model can be two-dimensional or three-dimensional according to the type of area. In the case of a three-dimensional model, the transitions between various levels (floors of a building for example) are part of the geometric model.

Finally, at step 140, the RSS measurements are stored in a database, with each measurement stored in relation with the point of the geometric model that was associated to it at the preceding step. More precisely, each record of the database comprises position information (the coordinates of the point of the geometric model) as well as the RSS levels of the measurement. The database as such contains a mapping of Wi-Fi fingerprints of the area.

The steps 110 to 140 can be executed according to a collaborative process. In other words, the database can be constituted and/or supplemented by users that successively pass through the geographical area.

Those skilled in the art will understand that the database of Wi-Fi fingerprints can then be used conventionally to determine the position of a user. To do this, the receiver (terminal provided with a Wi-Fi card, smartphone) of the user measures the strength levels of the various access points, search in the database the Wi-Fi fingerprint that is the closest to this measurement in terms of a predetermined metric and retrieves the coordinates of the point associated to the fingerprint obtained as such. Where applicable, the method of positioning determines a set of fingerprints that are closest to the measurement and carries out a barycentric calculation using the positions associated with these fingerprints.

Advantageously, the user enriches the database by carrying out a new sequence of measurements and by transmitting it to the server, while still using those already stored in the database for his own positioning.

The various steps of the method for mapping Wi-Fi fingerprints according to the invention are detailed hereinafter.

The determination of the graph that is representative of the path operates on at least one sequence of measurements of a user or of several users. When the database is obtained using a single sequence of measurements, the path of the user more preferably covers all of the area of which it is desired to carry out the RSS mapping.

Where applicable, the sequences of measurements can be grouped together by sub-areas (the geographical area can be for example divided into elementary areas or into separate areas). The classification by sub-area can be carried out using identifiers (BSSID) of the access points. For a given set of access points, then only the sequences for which the measurements have a non-zero RSS level (in practice less than a noise threshold) for at least one of the access points of this set shall be considered.

The determination of the graph that is representative of the path makes use of the notion of a matrix of distances (or dissimilarity matrix) of two sequences of measurements, with these sequences of measurements able to be separate or not.

Firstly, a mathematical operator D of distance (Euclidean distance, Minkowski distance, Manhattan distance, Mahalanobis distance) is introduced between two RSS measurements. This distance is none other than that between the vectors of size P that represent these measurements.

Figure 2:
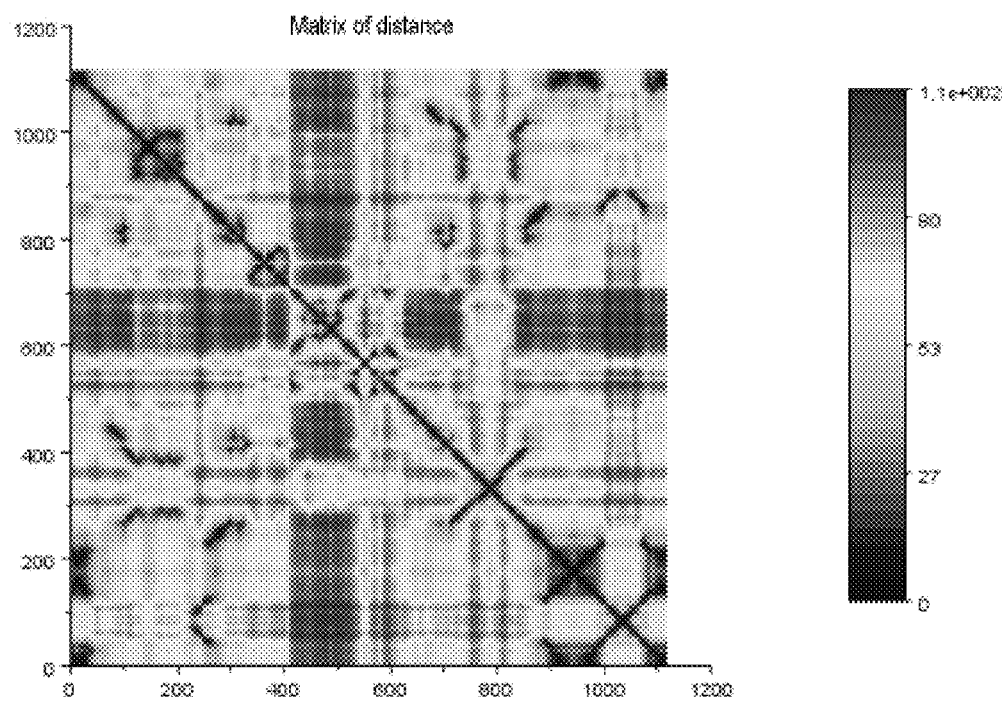
FIG. 2 shows an example of a matrix of the distances used in the step of determining the graph that is representative of the path of FIG. 1.

In order to estimate the similarity/dissimilarity between a first sequence of measurements $M_1$ and a second sequence of measurements $M_2$, the distance between each measurement of $M_1$ and each measurement of $M_2$ is calculated. If the first sequence is of length $N_1$ and the second sequence of length $N_2$, a matrix of distances $D(M_1, M_2)$ is then obtained of size $N_1 \times N_2$ of which the elements are the distances $D(\mu_i, \mu_j)$, where $\mu_i$ and $\mu_j$ are respectively measurements of $M_1$ and $M_2$, $i=1, \ldots, N_1$ and $j=1, \ldots, N_2$. When a sequence of measurement M is compared to itself, the matrix of distances $D(M, M)$ is squared, symmetrical and of zero diagonal. By way of example, FIG. 2 shows the matrix of distances $D(M, M)$ of the same sequence of measurements. Note that, when additional measurements (other than RSS) are present in the matrix M, the matrix of distances also takes them into account.

In the matrix of distances, the RSS measurements are arranged according to a chronological order, in other words, in the order of the sequence to which they belong. As such two consecutive lines or two consecutive columns correspond to consecutive measurements. A rectangular block in the matrix of similarity, delimited by the lines $i_1$ and $i_2$, and the columns $j_1$ and $j_2$ measures the similarity between a portion ($i_1$ to $i_2$) of the first sequence and a portion ($j_1$ to $j_2$) of the second sequence. If a square block of the matrix has low values (less than a predetermined threshold) on the diagonal thereof, this means that the two portions of the sequences of measurements are substantially aligned, and correspond consequently to a common portion of path, travelled in the same direction. Likewise, if this same block has low values on the anti-diagonal thereof, this means that the two portions of the sequences of measurements correspond to a common portion of path, travelled in the opposite direction.

When several elementary sequences $M_1, M_2, \ldots, M_Q$ collected by one or several users are grouped together into a composite sequence M obtained by concatenation of these sequences, the matrix of distances of the composite sequence M, noted as $D(M, M)$, gives the matrices of distances of the elementary sequences that comprise it, or $D(M_q, M_q)$, $q=1, \ldots, Q$ as well as the matrices of distances between these sequences, $D(M_q, M_{q'})=D(M_{q'}, M_q)$, $q, q'=1, \ldots, Q$. Indeed, $D(M, M)$ is expressed as follows:

$$D(M, M) = \begin{pmatrix} D(M_1, M_1) & D(M_1, M_2) & \ldots & D(M_1, M_Q) \\ D(M_2, M_1) & D(M_2, M_2) & \ldots & D(M_2, M_Q) \\ \vdots & \vdots & \ddots & \vdots \\ D(M_Q, M_1) & D(M_Q, M_2) & \ldots & D(M_Q, M_Q) \end{pmatrix} \quad (2)$$

Figure 3:
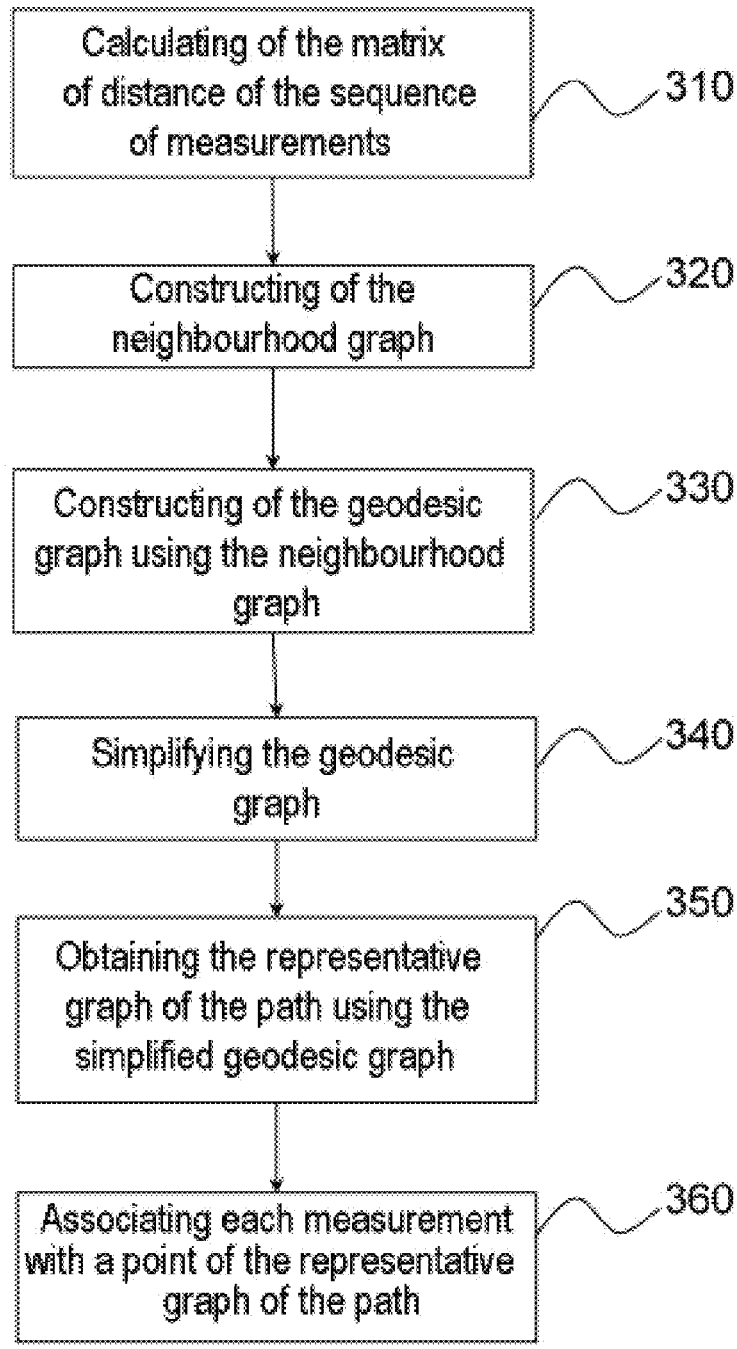
FIG. 3 shows in the form of a flowchart an embodiment of the step of determining the graph that is representative of the path of FIG. 1.

FIG. 3 shows an embodiment of the step of determination of the graph that is representative of the path in FIG. 1.

In a first step, 310, the matrix of distances $D(M, M)$ of the sequence of measurements is calculated. When a sequence of measurements $M_{av}$ is already available in the database, the matrix of distances can be calculated in relation to this latter sequence $D(M, M_{av})$, with the rest of the processing being identical. For reasons of simplification, but without loss of generality, only the first shall be described hereinafter.

In step 320, a first graph is constructed, referred to as neighbourhood graph, V, using the matrix of distances calculated in the preceding step. To do this, each measurement is assigned a node of the graph and an adjacency matrix $M_{ad}$ of size N×N is calculated (where N is the length of the sequence), of which the elements are of binary values $a_{ij}$ such that $a_{ij}=1$ if the measurements $\mu_i, \mu_j$ (corresponding respectively to the nodes i, j of the graph) satisfy a neighbourhood criterion, and $a_{ij}=0$ otherwise.

The neighbourhood criterion is a criterion of temporal proximity and, possibly, of similarity. More precisely, two measurements of rows i, j of the sequence shall be considered as temporally close (and therefore neighbouring) if $|i-j| \leq \theta$. Preferably, $\theta=1$ is chosen, in other words two measurements are considered as temporally close of they are successive and the nodes that represent them are connected by an edge. In this case, for a temporally continuous sequence of measurements, the main diagonal of the adjacency matrix as well as the secondary diagonals above and below the main diagonal are constituted of elements equal to 1. Alternatively, when the measurements are time stamped, the criterion of temporal proximity can concern the instants of the measurements, with two measurements being considered as close if these instants of measurement are separated by less than a predetermined temporal shift τ. The adjacency matrix will then comprise a diagonal strip of variable width of elements equal to 1.

Figure 4:
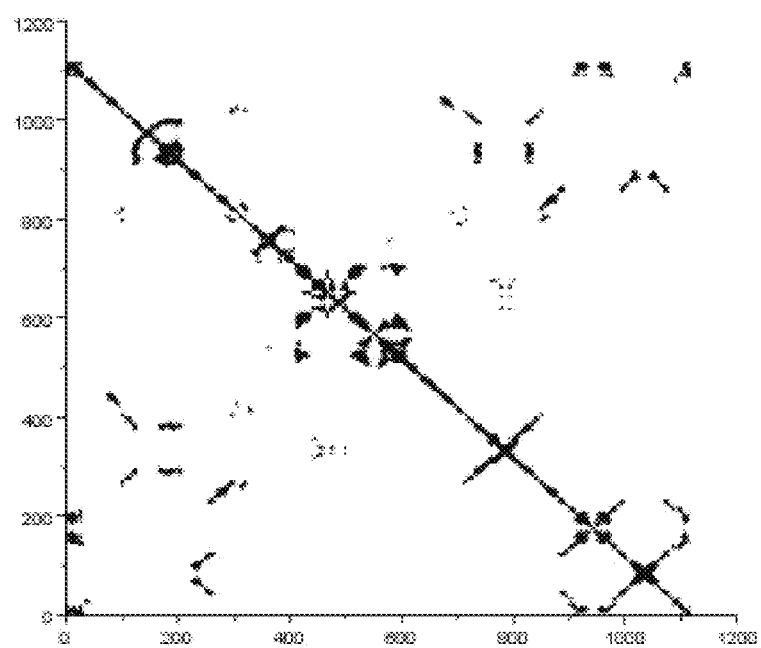
FIG. 4 shows an example of an adjacency matrix calculated in the step 320 of FIG. 3.

By way of example, FIG. 4 shows the adjacency matrix corresponding to the matrix of distances of FIG. 2. The points of this figure at indices i, j correspond to $a_{ij}=1$. The other elements are zero.

In addition to the criterion of temporal proximity, a criterion of similarity can be used. For example two measurements $\mu_i, \mu_j$ will be considered as similar if the distance thereof $D(\mu_i, \mu_j) < \epsilon$, where $\epsilon$ is a predetermined threshold distance. Alternatively or cumulatively, two measurements will be considered as similar if they "see" the same set of access points. More precisely, two measurements $\mu_i, \mu_j$ will be considered as neighbouring if $\{p=1, \ldots, P|\mu_i^p > \mu_{Th}\} = \{p=1, \ldots, P|\mu_j^p > \mu_{Th}\}$. For example $\mu_{Th}=0$ can be taken. Alternatively or cumulatively again, two measurements will be considered as similar if they correspond to a local minimum of the strength measured for an access point P.

In the case where the receiver is provided with additional sensors and where the measurements of these sensors, referred to in what follows as additional measurements, are time stamped in the same way as the RSS measurements, a distance between the additional measurements can be used as an additional criterion of similarity. For example, the criterion of similarity will be considered as fulfilled if $D(\mu_i, \mu_j) < \epsilon$ in the preceding sense and if $D(\mu'_i, \mu'_j) < \epsilon'$ where $\mu'_i, \mu'_j$ represent the additional measurements taken at the same respective instants as the measurements $\mu_i, \mu_j$, and where $\epsilon'$ is a predetermined threshold value. Where applicable, if the additional measurements are taken at separate instants of the RSS measurements, an interpolation can be carried out in such a way as to proceed with a temporal aligning of the former on the latter. Alternatively again, when the receiver proceeds with a dead reckoning on the basis of additional time stamped measurements, the criterion of similarity can be considered as fulfilled if $D(\mu_i, \mu_j) < \epsilon$ in the preceding sense and if $d(P_i, P_j) \leq \eta$ where $P_i$ and $P_j$ are the points of the path of dead reckoning corresponding to the instants of the measurements $\mu_i$, $\mu_j$, and where $\eta$ is a predetermined threshold value.

In any case, if two measurements $\mu_i$, $\mu_j$ are considered as temporally close or similar in the preceding sense, $a_{ij}=1$, and the nodes of indices i, j of the neighbourhood graph are connected by an edge. It will be understood that the neighbourhood graph comprises a relatively low number of edges. The weight of an edge between nodes of the neighbourhood graph is given by the distance between the corresponding measurements, namely $D(\mu_i, \mu_j)$.

In step 330, a second graph is constructed, referred to as geodesic graph, G, using the neighbourhood graph, V. The geodesic graph, contrary to the neighbourhood graph, is complete. In other words, each node of G is connected by an edge to each of the other nodes of G.

The weight of the edges of the geodesic graph are obtained using the shortest paths in the neighbourhood graph. More precisely, if the edge joining the nodes i, j of the graph G is considered, the weight $d_{ij}$ of this edge is given by the length of the shortest path between the nodes i, j of the graph V.

It is important to note that the weights $d_{ij}$, contrary to the distances $D(\mu_i, \mu_j)$, have a geodesic meaning in that they supply an estimate of the distance between the points of the geographical area where these measurements were carried out. These distances are referred to in what follows as geodesic distances in order to distinguish them from the distances between measurements $D(\mu_i, \mu_j)$.

The geodesic graph G connects points in a space of dimension P (space of measurements). Given that these measurements were taken at points of dimension 2 or 3 (space of the geographical area), it is intuitively understood that the matrix M representing the sequence of measurements is degenerated and the latter can therefore be represented in a space of reduced dimension (namely 2 or 3 instead of P).

Optionally, the geodesic graph is the object of a reduction in dimension, for example thanks to a MDS-MAP algorithm of which there is for example a description in the article of C. Ellis et al. entitled "A comparison of MDS-MAP and non-linear regression" published in Proc. of 2010 International Conference on Indoor Positioning and Indoor Navigation (IPIN), 15-17 Sep. 2010, Zurich.

Regardless of the dimension of the geodesic graph (reduced or not), the latter is then the object of a simplification in step 340, advantageously by means of a clustering. The purpose of this step is to group the nodes together into significant aggregates (or clusters). A preferred embodiment of the clustering is given hereinafter.

In a first step, for each point of the geodesic graph, all of the points located in a neighbourhood of this point are determined, at least of a predetermined geodesic distance, $\delta$, of the latter. This geodesic distance can be set according to the average geodesic distance between nodes that represent successive measurements. For example, if the average distance between successive measurements is noted as $\eta$, the neighbourhood can be defined by a ball with a radius of $\kappa$, $\eta$ where $\kappa$ is a factor strictly greater than 1 (for example $\kappa=4$).

The neighbourhood of the node defined as such, the distribution of the nodes contained in this neighbourhood is considered and a principal component analysis is carried out on this distribution. The principal component analysis is done in the space of the measurements or in the space of reduced dimension according to whether there has been beforehand or not a reduction of dimension. The principal component analysis consists in calculating the eigenvalues of the matrix of correlation of the coordinates of the nodes in the space considered. The eigenvalues are then sorted in decreasing order. If $\lambda_1$ and $\lambda_2$ are noted as respectively the first and the second eigenvalues of the list, the node is classified as being of the first type if $\lambda_1/\lambda_2 \square 1$ and as a second type in the opposite case, i.e. $\lambda_1 \approx \lambda_2$. More precisely, the node is considered as a node of the first type if $\lambda_1/\lambda_2 \geq \rho$ where $\rho$ is a threshold of ellipticity, and of the second type in the opposite case. The neighbourhood of a node of the first type is located substantially along a straight line. Such a node will be associated with an edge of the graph that is representative of the path. On the other hand, the neighbourhood of a node of the second type is distributed without a privileged direction. Such a node is a candidate for grouping in a cluster, as described hereinbelow.

Figure 5A:
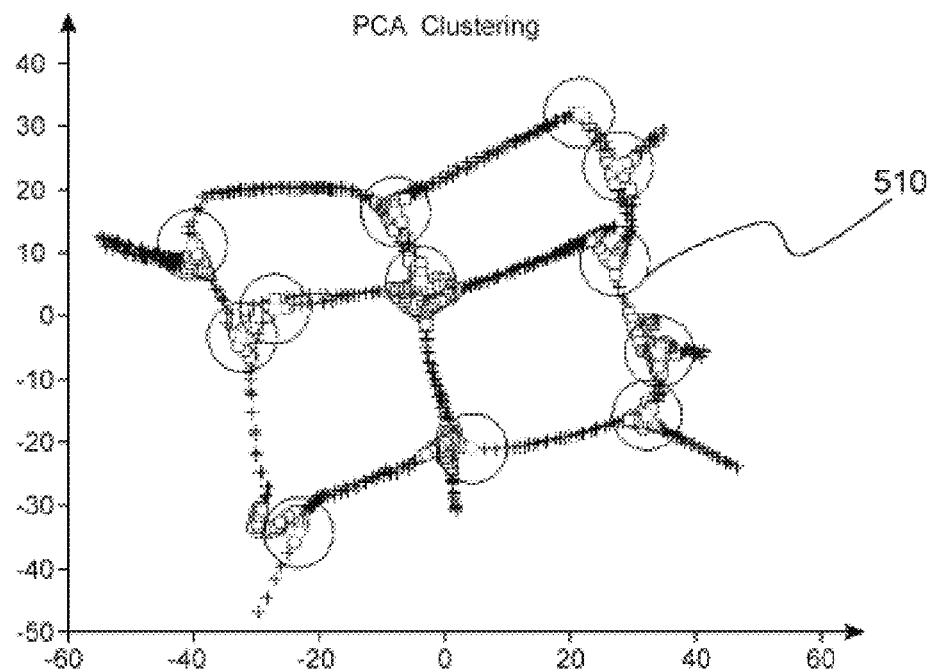
FIG. 5A shows a geodesic graph wherein have been identified nodes of the first type and nodes of the second type in the step 340 of FIG. 3.

FIG. 5A shows an example of a geodesic graph (of which the dimension has been reduced to 2) wherein the nodes of the first type (shown in the form of a cross) and the nodes of the second type (shown in the form of squares) have been classified. The nodes of the second type are grouped together into clusters shown by the circles 510.

Nodes of the second type are grouped together in the same cluster if they satisfy a predetermined criterion of connectivity. For example, the criterion of connectivity can be that these nodes are connected together in the neighbourhood graph. A more selective criterion can be chosen by adding an additional condition according to which a node is part of a given cluster only when it is connected, in the neighbourhood graph, to more than half of the nodes of this cluster.

Many algorithms for graph clustering can be used in order to determine the nodes of first and second types, and in order to group these nodes together by type. Reference can in particular be made to those reviewed in the article of S. E. Schaeffer entitled "Graph clustering" published in Computer Science Review I (2007), pages 27-64.

A representative node by cluster is then chosen, for example the node of the highest degree in the neighbourhood graph or that having the lowest $\lambda_1/\lambda_2$ ratio, i.e. the closest to 1.

Figure 5B:
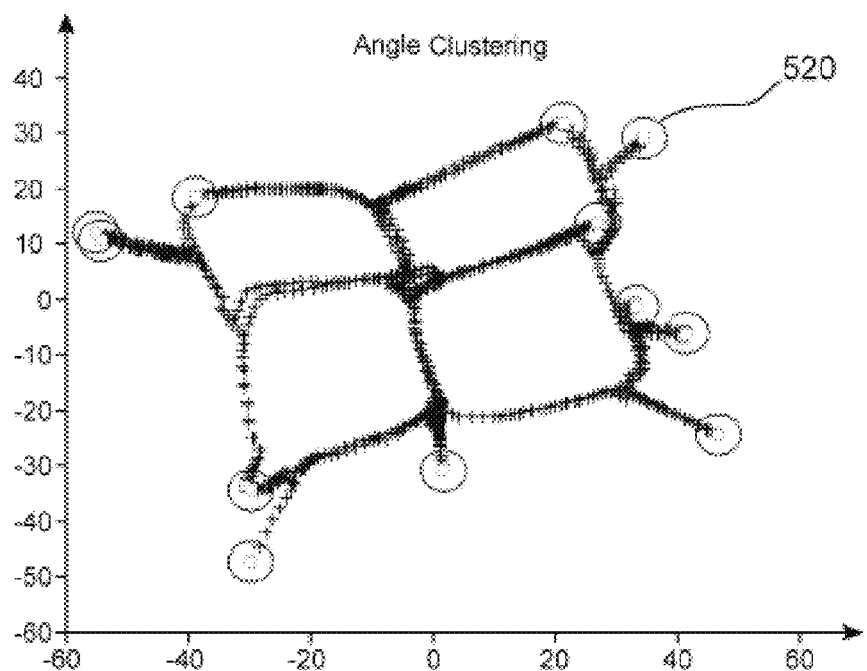
FIG. 5B shows a geodesic graph wherein singular nodes have been identified.

According to an alternative, singular nodes are identified in addition in the geodesic graph. FIG. 5B shows the same example of geodesic graph as FIG. 5A, wherein singular nodes have been surrounded by circles 520. These singular nodes have a particular local configuration: they are for example ends of branches (degree equal to 1 in the neighbourhood graph) or nodes corresponding to discontinuities of direction. They are advantageously characterised by considering the neighbourhood of a node v and by determining for each pair of nodes $(v_1, v_2)$ that belong to this neighbourhood, the angle $$\beta = (\vec{vv_1}, \vec{vv_2}).$$

If the distribution of the angle $\beta$ on the neighbourhood is included in a range $[\beta_{min}, \beta_{max}]$ of extent less than 360°, the node in question can be identified as singular.

Returning to FIG. 3, the graph that is representative of the path, $\Omega$, is determined in 350 using the geodesic graph, G, simplified in the preceding step, as explained hereinabove. In the case of a clustering, it is understood that the representatives of these clusters and, where applicable, the singular nodes, constitute the nodes of the graph $\Omega$.

Figure 5C:
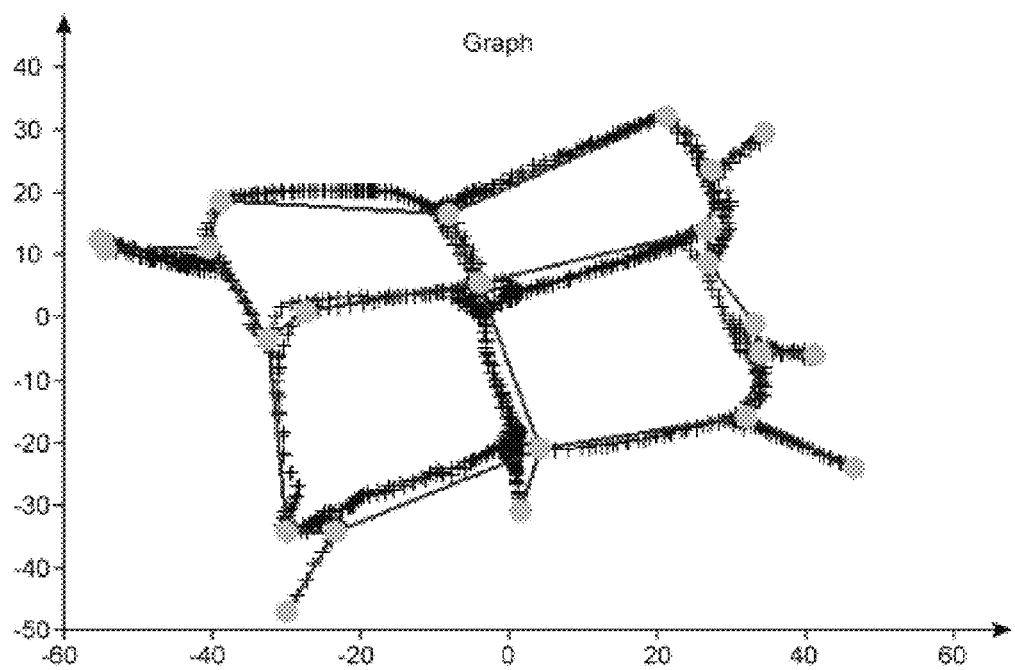
FIG. 5C shows a graph that is representative of the path of the user.

FIG. 5C shows an example of a graph representative of the path, obtained using the geodesic graph of FIG. 5B. The nodes 530 are the nodes of the simplified graph obtained in the step 340.

Figure 5D:
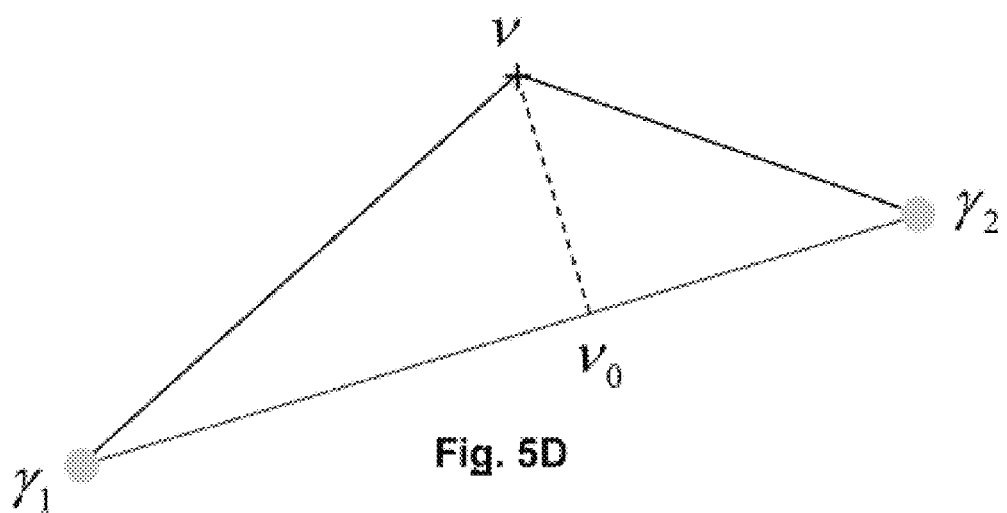
FIG. 5D shows a way of associating a node of the geodesic graph with a point of an edge of the graph that is representative of the path in FIG. 5C.

The edges of the graph Ω are obtained in the following way. All of the nodes v of the geodesic graph are considered successively except those that have already been selected as nodes of the graph Ω (for example representative nodes of clusters, singular nodes). For each of these nodes, v, using the geodesic graph, the pair of nodes ($\gamma_1$, $\gamma_2$) of the graph Ω that is closest to v (in terms of the shortest geodesic distance) is determined. If an edge E is not present between the nodes $\gamma_1$ and $\gamma_2$ in Ω, the hypothesis is made that such an edge exists. The node v is then projected on the edge E, with the projection being calculated in the space of measurements or in the space of reduced dimension according to the case. $v_0$ is the point projected on this edge as shown in FIG. 5D. It is then possible to determine the cosine of the angle α formed by $\overrightarrow{\gamma_1 v}$ and $\overrightarrow{\gamma_1 \gamma_2}$ by means of geodesic distances $d_{\gamma_1 v}$, $d_{\gamma_1 \gamma_2}$ and $d_{\gamma_2 v}$ namely $$\cos\alpha = \frac{d_{\gamma_1 v}^2 + d_{\gamma_1 \gamma_2}^2 - d_{\gamma_2 v}^2}{2 d_{\gamma_1 v} d_{\gamma_1 \gamma_2}}$$

and $d_{\gamma_1 v_0} = d_{\gamma_1 v}/\cos\alpha$. It is then verified if $\cos\alpha > \beta_T$ (where $\beta_T$ is a predetermined threshold) and if $d_{\gamma_1 v_0} < d_{\gamma_1 \gamma_2}$. If this is indeed the case, the hypothetical edge between $\gamma_1$ and $\gamma_2$ is validated, otherwise the processing continues with the next node of the geodesic graph.

When the processing of all of the points of the geodesic graph is complete, all of the edges of the graph Ω have been obtained, as shown in FIG. 5C.

In step 360, each measurement is associated with a point of the graph Ω. Point of the graph Ω means either a node γ, or a point of an edge of Ω. More precisely, if said measurement is represented by a node v of G, two situations can occur:

a) the node v of G is also a node of the graph Ω (for example if v is the representative of a cluster of G), the measurement is then associated with the node v of Ω;

b) the node v of G is not a node of the graph Ω, the measurement is then associated with the node $v_0$, projection of v on the edge E connecting the couple of the nodes ($\gamma_1$, $\gamma_2$) of Ω such that $\gamma_1$ is the closest to v (in terms of the shortest geodesic distance) and $\gamma_2$ is the node Γ of Ω that maximises the cosine of the angle α formed by $\overrightarrow{\gamma_1 v}$ and $\overrightarrow{\gamma_1 \sigma}$. The measurement in question is then associated with the pair of nodes ($\gamma_1$, $\gamma_2$) and to an interpolation coefficient χ between $\gamma_i$ and $\gamma_2$.

As described hereinabove, the method for mapping Wi-Fi fingerprints continues with a topographical characterisation of the path, and more precisely of the representative graph Ω.

This topographical characterisation calls upon a geometric model of the area considered (wired representation, navigation graph). Preferably, the geometric model has the form of a graph, referred to hereinafter as the geometric graph Γ of this area. If the geometric model does not have the form of a graph, it is still possible to return to the preceding case by extracting a graph of the model in question. Where applicable, several geometric graphs can be extracted from the geometric model, with each geometric graph corresponding to a different degree of resolution.

The graph Γ comprises edges representing axes of displacement in the area (for example corridors), with these edges connecting nodes that represent generally either intersections between axes of displacement (crossings, changes in direction), or, for the end nodes, accesses to the area in question (entrances/exits). In any case, the coordinates (2D or 3D) of each node of Γ are known. The position of a point located on an edge of Γ is deduced simply by interpolation of the coordinates of the nodes connected by this edge.

Figure 6:
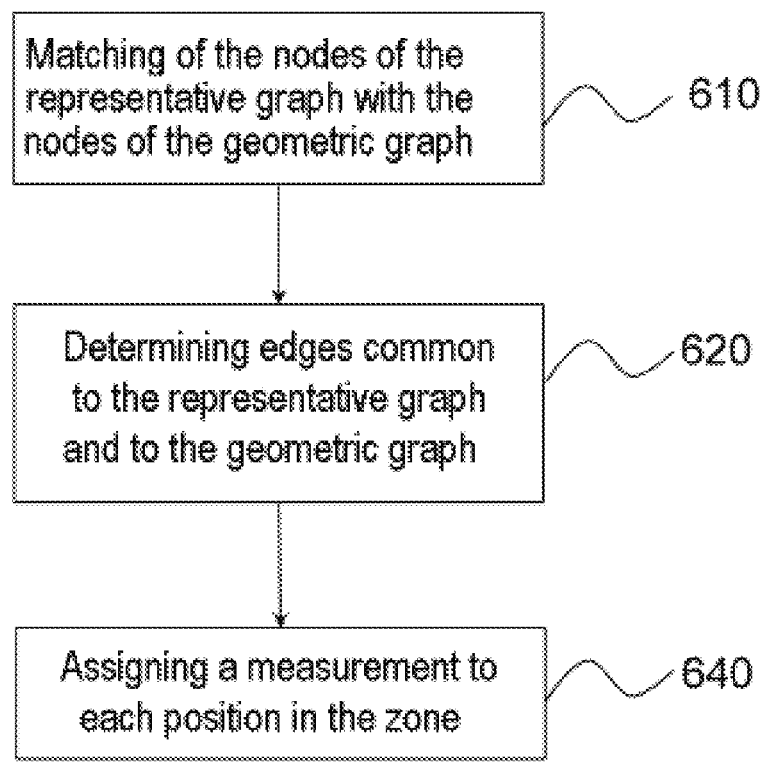
FIG. 6 shows in the form of a flowchart an embodiment of the step of topographical characterisation of FIG. 1.

FIG. 6 shows an embodiment of the topographical characterisation of the graph Ω.

In a first step, 610, the nodes of the graph Ω are matched with nodes of the geometric graph, Γ.

For this purpose, graph matching methods known from prior art can be used, for example that described in the article of M. Zaslayskiy et al. entitled "A path following algorithm for the graph matching problem" published in IEEE Trans. on pattern analysis and machine intelligence, Vol. 31, No. 12, December 2009, pages 2227-2242.

When the sequence of measurements for departure comprise a labelled measurement, the matching advantageously uses this labelling in order to facilitate the matching between nodes. More precisely, if the labelled measurement corresponds to a node of the graph Ω, this node is matched to the node of Γ that has the position that is the closest to that of the label. If the labelled measurement corresponds to a point $v_0$ of an edge E between two nodes $\gamma_1$ and $\gamma_2$ (with an interpolation ratio χ) of Ω, the nodes $\gamma_1$ and $\gamma_2$ will respectively be matched with nodes $\gamma'_1$ and $\gamma'_2$ of Γ such that the point v' obtained by interpolation between $\gamma'_1$ and $\gamma'_2$ (with the same interpolation ratio) are as close as possible to that given by the label. Generally, when a measurement is labelled, the matching of the nodes must comply as best as possible with the constraint of the position given by the label, for example by minimising a cost function.

If the receiver is provided with additional sensors suited for providing information on the distance travelled (pedometer for example) or on the direction (gyrometer, magnetometer, etc.) and that the additional measurements are labelled by this information (in practice a record of the database then comprises, in addition to the P RSS levels, an indication provided by the sensor), the information in question can also be used in order to facilitate the matching.

Once this matching of nodes is carried out, the edges common to the graphs Ω and Γ are determined in 620. An edge of the graph Γ can correspond (in other words be equivalent) to several edges of the graph Ω.

According to a first alternative, if the receiver, still provided with additional sensors, carries out an estimate of the path of dead reckoning thereof, geometric information relative to this path can be used in order to facilitate the matching of the nodes and/or of the edges in steps 610 and 620. This geometric information can be in particular lengths of path segments and/or relative orientations between segments. As such segments extracted from the path of dead reckoning cannot be matched to edges of the geometric graph if the respective lengths thereof differ substantially.

According to a second alternative, the matching of the nodes and of the edges of the graph Ω with those of the geometric graph is carried out via the intermediary of a matching of the path of dead reckoning with the geometric graph.

More precisely, in a first step, the path of dead reckoning is put into correspondence with the geometric graph by searching for a path of this graph that is as close as possible to this path. This putting into correspondence can be carried out for example using a probabilistic algorithm of graph matching such as described in the article mentioned hereinabove. The putting into correspondence can furthermore advantageously use labelled data when certain additional measurements are attached to determined positions.

In a second step, the temporal relation between the RSS measurements and the additional measurements is used to match the graph $\Omega$ with the geometric graph. Indeed, an RSS measurement simultaneous to an additional measurement can be associated with a point of the path of dead reckoning and therefore, via the preceding putting into correspondence, to a point of the geometric graph.

In step 630, each measurement is assigned a position in the following way:

If the measurement corresponds to a node $\gamma$ of the graph $\Omega$ (situation (a) hereinabove), the position assigned to the measurement is that of the node $\gamma'$ of $\Gamma$ matched with $\gamma$.

If the measurement corresponds to a point $v_0$ an edge $\gamma_1\gamma_2$ of G, the position assigned to the measurement is obtained by interpolation (with the same interpolation coefficient $\chi$ characterising $v_0$) between the positions of the nodes $\gamma'_1$ and $\gamma'_2$ of $\Gamma$ respectively matched with $\gamma_1$ and $\gamma_2$.

When a measurement is labelled, the latter retains the position information given by the label and the position provided in the step 640 may not be associated with it.

After a position has been assigned to each measurement, the measurements as well as the respective assigned positions thereof are stored in the database. A mapping of Wi-Fi fingerprints is as such obtained.

This mapping can be used by the user in order to directly determine the path thereof and a fortiori the current position thereof. Note that this positioning does not require having beforehand a mapping of RSS measurements but on the contrary this mapping can be elaborated from the measurements carried out.

In a preferred embodiment, the mapping of Wi-Fi fingerprints is elaborated in a collaborative manner, with each user simultaneously or successively providing a sequence of measurements during the displacement along the respective path thereof.

The mapping of Wi-Fi fingerprints can then be used conventionally in order to allow any user to be positioned in the area using the Wi-Fi fingerprint measured by the terminal thereof.

The invention claimed is:

1. Method for mapping Wi-Fi fingerprints in a predetermined geographical area, comprising:
   a step of collecting Wi-Fi signal strength measurements, with each measurement being represented by a vector constituted by the respective signal strength levels emitted by a plurality of Wi-Fi access points, with the collecting of said measurements being carried out sequentially along at least one path of a user in said geographical area, in order to provide at least one sequence of measurements;
   a step of determining a graph that is representative of the path, with each measurement of said sequence corresponding to a node or to a single point of an edge of this graph;
   a step of topographical characterisation of said path using at least said graph that is representative of the path and a geometric model of the geographical area, with the topographical characterisation associating each measurement with a point of the geometric model;
   a step of storing the sequence of measurements in a database, with each measurement stored in relation with the point of the geometric model that was associated to it in the preceding step.

2. Method for mapping Wi-Fi fingerprints according to claim 1, wherein the step of determining the graph that is representative of the path ($\Omega$) comprises the calculation of a matrix of distances constituted by distances between the measurements of said sequence, taken two by two, with the measurements of said sequence being arranged according to a predetermined chronological order.

3. Method for mapping Wi-Fi fingerprints according to claim 2, wherein the determining of the graph that is representative of the path ($\Omega$) further comprises the following steps:
   construction of a first graph, referred to as neighbourhood graph (V), of which each node corresponds to a measurement of said sequence of measurements, with two nodes of the first graph being connected by an edge if the measurements corresponding to these nodes satisfy a neighbourhood criterion, with said edge then being affected by a weight equal to the distance between these measurements;
   constructing of a second graph, of which the nodes are identical to the nodes of the first graph, referred to as geodesic graph (G), with two nodes of the geodesic graph being connected by an edge of which the weight is equal to the length of the shortest path between these nodes in the neighbourhood graph.

4. Method for mapping Wi-Fi fingerprints according to claim 3, further comprising collecting of time stamped measurements from additional sensors, referred to as additional measurements, the calculation of a dead reckoning path from said additional measurements, said neighbourhood criterion of two measurements being satisfied if a distance ($D(\mu_i, \mu_j)$) between these two measurements is less than a first predetermined threshold and if the distance ($d(P_i, P_j)$) between the points of the dead reckoning path where these measurements were taken is less than a second predetermined threshold.

5. Method for mapping Wi-Fi fingerprints according to claim 3, wherein the geodesic graph is subjected to a reduction of dimension using a MDS-MAP algorithm.

6. Method for mapping Wi-Fi fingerprints according to claim 3, wherein the graph that is representative of the path is obtained by simplification of the geodesic graph.

7. Method for mapping Wi-Fi fingerprints according to claim 6, wherein the simplification of the geodesic graph is carried out by means of a clustering for this graph, after reduction of dimension or not, the nodes of the graph representative of the path being respective representatives of the clusters thus obtained.

8. Method for mapping Wi-Fi fingerprints according to claim 7, wherein the clustering of the geodesic graph is carried out by:
   carrying out a principal component analysis of the measurements corresponding to the nodes of the geodesic graph located in a neighbourhood of this node;
   sorting in descending order the eigenvalues obtained by said analysis;
   comparing the ratio of the first to the second eigenvalue in relation to a predetermined threshold, with the node being classified as being of the first type, if the ratio is greater than this threshold, and as being of the second type, in the opposite case; and
   grouping together into the same cluster the nodes of the second type that satisfy a predetermined criterion of connectivity.

9. Method for mapping Wi-Fi fingerprints according to claim 8, wherein the criterion of connectivity of a node of the geodesic graph is the number of edges connected to this node in the neighbourhood graph.

10. Method for mapping Wi-Fi fingerprints according to claim 6, wherein each measurement is associated a point of the graph that is representative of the path, said point being defined either as a node or as a point on an edge of this graph.

11. Method for mapping Wi-Fi fingerprints according to claim 10, wherein if the node of the geodesic graph representing said measurement is also part of the graph that is representative of the path, the measurement is associated with this node, and otherwise, the node of the geodesic graph, representing said measurement, is projected on an edge connecting first and second nodes, the measurement then being associated with the point obtained by projection, defined by the pair of said first and second nodes and by a interpolation coefficient between these nodes.

12. Method for mapping Wi-Fi fingerprints according to claim 1, wherein the step of topographical characterisation of the path comprises a graph matching that is representative of the path with a graph extracted from the geometric model, referred to as geometric graph.

13. Method for mapping Wi-Fi fingerprints according to claim 12, wherein collecting of time stamped measurements from additional sensors, referred to as additional measurements, the calculation of a dead reckoning path from said additional measurements, and that the graph matching that is representative of the path and of the geometric graph uses geometric information relative to the dead reckoning path.

14. Method for mapping Wi-Fi fingerprints according to claim 12, wherein collecting of time stamped measurements from additional sensors, referred to as additional measurements, the calculation of a dead reckoning path from said additional measurements, and that the graph matching that is representative of the path and of the geometric graph comprises an intermediary step of matching the dead reckoning path with a path of the geometric graph.

15. Method for mapping Wi-Fi fingerprints according to claim 12, wherein each measurement associated with a node of the graph that is representative of the path is then attributed the position of the node of the geometric graph that is matched to it, and that each measurement associated to a point of an edge of the graph representative of the path is attributed a position obtained by interpolation between the positions of the nodes of the geometric graph respectively matched to the nodes connected by this edge in said representative graph.

16. Method for mapping according to claim 15, wherein for a given measurement, the interpolation between the positions of the nodes of the geometric graph use the same interpolation coefficient ($\chi$) as that between nodes of the graph that is representative of the path.

17. Method for mapping according to claim 12, wherein if the labelled measurement is associated with a node of the graph representative of the path, this node is matched to the node of the geometric graph that has the position closest to that given by the label of the measurement.

18. Method for mapping Wi-Fi fingerprints according to claim 1, wherein at least one measurement is labelled by a label giving position information.

* * * * *